(12) United States Patent
Fountain

(10) Patent No.: US 9,511,937 B2
(45) Date of Patent: Dec. 6, 2016

(54) SINGULATING CONVEYOR SYSTEM

(71) Applicant: Integrated Solutions, Inc., Memphis, TN (US)

(72) Inventor: John Fountain, Collierville, TN (US)

(73) Assignee: Integrated Solutions, Inc., Memphis, TN (US)

( * ) Notice: Subject to any disclaimer, the term of this patent is extended or adjusted under 35 U.S.C. 154(b) by 0 days.

(21) Appl. No.: 14/578,577

(22) Filed: Dec. 22, 2014

(65) Prior Publication Data

US 2016/0176652 A1    Jun. 23, 2016

(51) Int. Cl.
*B65G 13/04* (2006.01)
*B65G 47/28* (2006.01)
*B65G 47/244* (2006.01)
*B65G 47/68* (2006.01)

(52) U.S. Cl.
CPC ............ *B65G 13/04* (2013.01); *B65G 47/244* (2013.01); *B65G 47/28* (2013.01); *B65G 47/682* (2013.01)

(58) Field of Classification Search
CPC .... B65G 13/04; B65G 47/244; B65G 47/26; B65G 47/28; B65G 47/30; B65G 47/31; B65G 47/682
USPC .................. 198/448, 457.02, 784, 785, 786
See application file for complete search history.

(56) References Cited

U.S. PATENT DOCUMENTS

| | | | | |
|---|---|---|---|---|
| 1,946,453 A * | 2/1934 | Brodbeck | | B21B 39/00 198/448 |
| 4,044,897 A * | 8/1977 | Maxted | | B65G 47/71 198/349 |
| 4,181,947 A * | 1/1980 | Krauss | | B65G 47/50 198/349 |
| 5,400,896 A * | 3/1995 | Loomer | | B65G 47/71 198/415 |
| 5,415,281 A * | 5/1995 | Taylor | | B65G 47/682 198/448 |
| 5,501,315 A | 3/1996 | Loomer | | |
| 5,701,989 A | 12/1997 | Boone et al. | | |
| 6,253,905 B1 * | 7/2001 | Pelka | | B65G 47/082 198/415 |
| 6,269,933 B1 | 8/2001 | Schuitema et al. | | |
| 6,390,277 B2 | 5/2002 | Pelka | | |
| 6,412,621 B1 | 7/2002 | DeVree et al. | | |
| 6,622,847 B2 * | 9/2003 | Schuitema | | B65G 47/5145 198/370.09 |
| 6,659,264 B2 | 12/2003 | Pelka | | |
| 8,123,021 B2 * | 2/2012 | DePaso | | B65G 17/24 198/370.09 |
| 2007/0221475 A1 * | 9/2007 | Halsey | | B65G 13/071 198/442 |
| 2016/0031657 A1 * | 2/2016 | Cristoforetti | | B65G 47/22 198/448 |

* cited by examiner

*Primary Examiner* — Gene Crawford
*Assistant Examiner* — Keith R Campbell
(74) *Attorney, Agent, or Firm* — David J. Kreher

(57) ABSTRACT

A singulating conveyor system that consists of conveyor sets comprising driven tapered rollers oriented in a herringbone pattern about the centerline of the conveying surface which is capable of sorting a continuous flow of randomly oriented and sorted packages into a single file line of packages along the centerline of the conveyor surface.

6 Claims, 9 Drawing Sheets

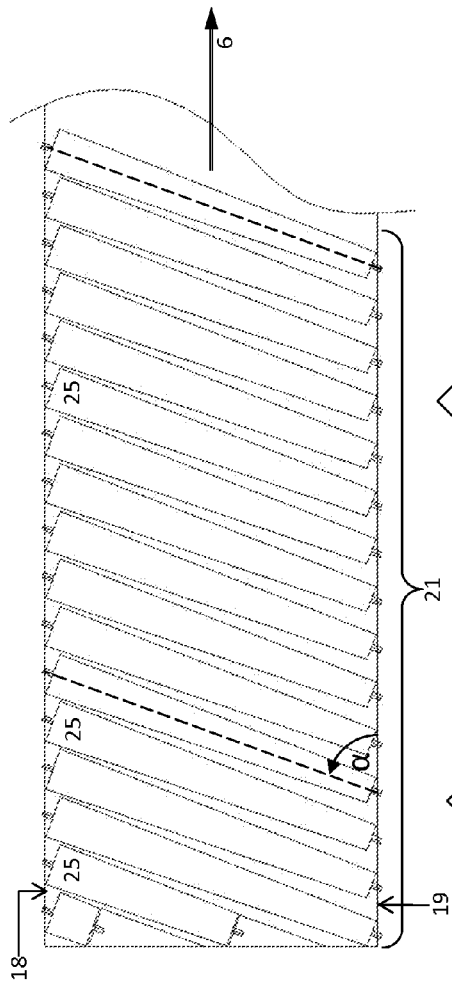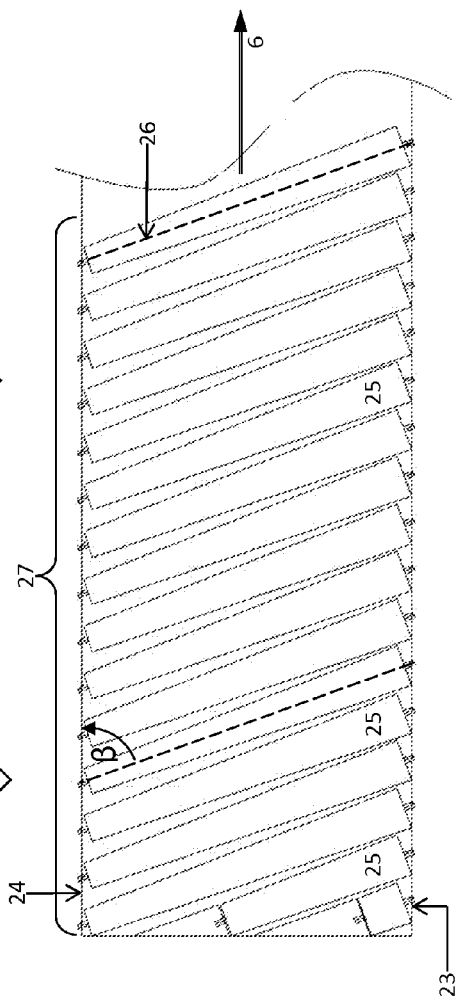

SINGULATING CONVEYOR SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

This invention relates to a singulating conveyor system capable of receiving continuous flow of randomly positioned, oriented and sized packages, which can then sort the packages into a single file line along the central axis of the singulating conveyor system, where the packages are generally oriented so that the long axis of each package is oriented along the direction of flow of the singulating conveyor system.

Background of the Invention

Many types of facilities around the world use package handling systems. These package handling systems frequently involve conveyor systems designed to move packages from one location to another. As the number of packages required to be moved has increased, the desire has arisen to include automation within the conveyor systems so that the packages could be sorted into groups, including but certainly not limited to content, size, type, destination, and future delivery method. Most sorting methods are based on a system whereby each package has a label of some sort capable of being read by a scanning device and that scanning device is then capable monitoring each package through the conveyor system in order to assure each package reaches its appropriate destination for further handling. Inherent in the system is that each package must go by the scanning device one at a time so as to ensure the packages do not get misrouted or lost. Thus, there is a need for a conveyor system that can take a continuous feed of packages that are jumbled, of different sizes and various orientations and sort the collection into a single file line where the packages are correctly oriented so that each can be read by the scanning device.

This singulating conveyor system is capable of receiving a continuous feed of packages that are jumbled, of different sizes and various orientations and sort the collection into a single file line where the packages are correctly oriented with the use of conveyor sets comprised of tapered rollers arrayed in a herringbone fashion.

Many attempts have been made to try to resolve the issue of sorting packages into a single file line from a jumbled array.

In U.S. Pat. No. 5,400,896, Loomer discloses an unscrambling conveyor that includes two side-by-side sets of rollers arranged in a herringbone pattern, with successive sections having progressively increasing speeds, whereas the present disclosure reveals the use of tapered rollers, which allows for differing speeds within each section, where the exterior portion of each section and sorting can occur within each section, not just between sections.

In U.S. Pat. No. 5,501,315, Loomer discloses a conveyor system claiming two outputs, whreas the present disclosure reveals the use of tapered rollers in a herringbone array, which allows for differing speeds within each section and sorting can occur within each section, not just between sections.

In U.S. Pat. No. 6,253,905, Pelka discloses the use of tapered rollers and a side support. The tapered rollers force the packages toward the side support and accelerate outside packages in front of the ones already along the support. The present disclosure reveals the use of tapered rollers, but in a herringbone setup, causing the singular alignment of the packages to occur in the center of the herringbone, rather than along a side support.

In U.S. Pat. No. 6,269,933, Schuitema et al. discloses a recirculating bed that extracts the adjacent package to be recirculated back into the aligning process, whereas the present disclosure reveals a singlating process without the need for recirculation.

In U.S. Pat. No. 6,390,277, Pelka discloses a method of monitoring the packages as they are unscrambled.

In U.S. Pat. No. 6,412,621, DeVree, et al. discloses the use of angled tapered rollers to shunt packages to an overflow areas, whereas the present disclosure reveals the use of tapered rollers, but in a herringbone setup, causing the singular alignment of the packages to occur in the center of the herringbone, rather than shunting unsingluated packages to a recirculation area.

In U.S. Pat. No. 6,622,847, Schuitema et al. discloses multiple methods of recirculating packages in order to obtain a singulated process, whereas the resent disclosure reveals a singlating process without the need for recirculation.

In U.S. Pat. No. 6,659,264, Pelka, discloses a method of easily retrofitting portions of existing conveyor systems.

In U.S. Pat. No. 5,701,989, Boone, et al discloses parallel conveying lanes for singulation, where the outer lane moves the adjacent package into a recirculation mechanism, whereas the present discloser reveals a singlating process without need for recirculation.

SUMMARY OF THE INVENTION

The present disclosure is of a singulating conveyor system capable of receiving a continuous flow of jumbled, randomly oriented packages and sorting the packages into a single file line where each package is arranged such that the long axis of each package is oriented along the direction of flow of the singulating conveyor system through the use of a plurality of conveyor sets. Each conveyor set comprises a left group and a right group.

The left group comprises an outer attachment means and an inner attachment means, a plurality of tapered rollers, and a drive means. The plurality of tapered rollers is attached to the outer attachment means and the inner attachment means in such a fashion so as allow the plurality of tapered rollers to rotate and so that the top edge of each roller creates a horizontal plane. The plurality of tapered rollers are oriented in a herringbone fashion, such that the angle alpha ("α") between the left group inner attachment means and the tapered roller is less than 90° in the direction of flow of the singulating conveyor system. The drive means includes any means capable of facilitating the rotation of the plurality of tapered rollers including but not limited to chain driven, belt driven or gear driven.

The right group comprises an outer attachment means and an inner attachment means, a plurality of tapered rollers, and a drive means. The plurality of tapered rollers is attached to the outer attachment means and the inner attachment means in such a fashion so as allow the plurality of tapered rollers to rotate and so that the top edge of each roller creates a horizontal plane. The plurality of tapered rollers are oriented in a herringbone fashion, such that the angle alpha ("β") between the right group inner attachment means and the tapered roller is less than 90° in the direction of flow of the singulating conveyor. The drive means includes any means capable of facilitating the rotation of the plurality of tapered rollers including but not limited to chain driven, belt driven or gear driven.

The left group and the right group of each conveyor set are arranged so that the inner attachment means of the left group is aligned with the inner attachment means of the right group to create the centerline of the singulating conveyor system surface. The drive means that operates the left group and the right group may be the same drive means or separate, so that the left group and the right group can be operated at different rates.

Generally, subsequent conveyor sets within the plurality of conveyor sets rotate at different speeds so that when a package moves from one conveyor set to a subsequent conveyor set, the rate at which the package moves increases, increasing the distance between packages.

In the first embodiment of the conveyor set the plurality of tapered rollers are oriented such that the plurality of tapered rollers taper from the outer attachment means toward the inner attachment means. In this embodiment, the rate of rotation of the plurality of tapered rollers along the outer attachment means is faster than the rate of rotation along the centerline. This orientation causes a package that enters the conveyor set along the outer edge of the left group to rotate in a clockwise fashion and toward the centerline while traveling in the direction of flow, while a package that enters the conveyor set along the outer edge of the right group to rotate in a counter-clockwise fashion and toward the centerline while traveling in the direction of flow. Package rotation stops when the package crosses the centerline and the clockwise rotation from the left group is countered by the counter-clockwise rotation from the right group. Packages that are adjacent to a package traveling along the centerline move faster than the package traveling along the centerline and so would move ahead of the package traveling along the centerline.

In the second embodiment of the conveyor set the plurality of tapered rollers are oriented such that the plurality of tapered rollers taper from the inner attachment means toward the outer attachment means. In this embodiment, the rate of rotation along the centerline is faster than the rate of rotation along the outer attachment means. This orientation causes a package that enters the conveyor set along the outer edge of the left group to rotate in a counter-clockwise fashion and toward the centerline while traveling in the direction of flow, while a package that enters the conveyor set along the outer edge of the right group to rotate in a clockwise fashion and toward the centerline while traveling in the direction of flow. Package rotation stops when the package crosses the centerline and the counter-clockwise rotation from the left group is countered by the clockwise rotation from the right group. Packages that are adjacent to a package traveling along the centerline move slower than the package traveling along the centerline and so would fall behind the package traveling along the centerline.

Within the plurality of conveyor sets used to make a singulating conveyor system, any combination of the first embodiment and second embodiment of the conveyor sets can be used, depending on individual requirements.

BRIEF DESCRIPTION OF THE SEVERAL VIEWS OF THE DRAWING

FIG. 2A is a plan view of a left group of the conveyor set where the plurality of tapered rollers are oriented such that the plurality of tapered rollers taper from the outer attachment means toward the inner attachment means;

FIG. 2B is a plan view of a right group of the conveyor set where the plurality of tapered rollers are oriented such that the plurality of tapered rollers taper from the outer attachment means toward the inner attachment means;

DETAILED DESCRIPTION OF THE INVENTION

Figure 1A:
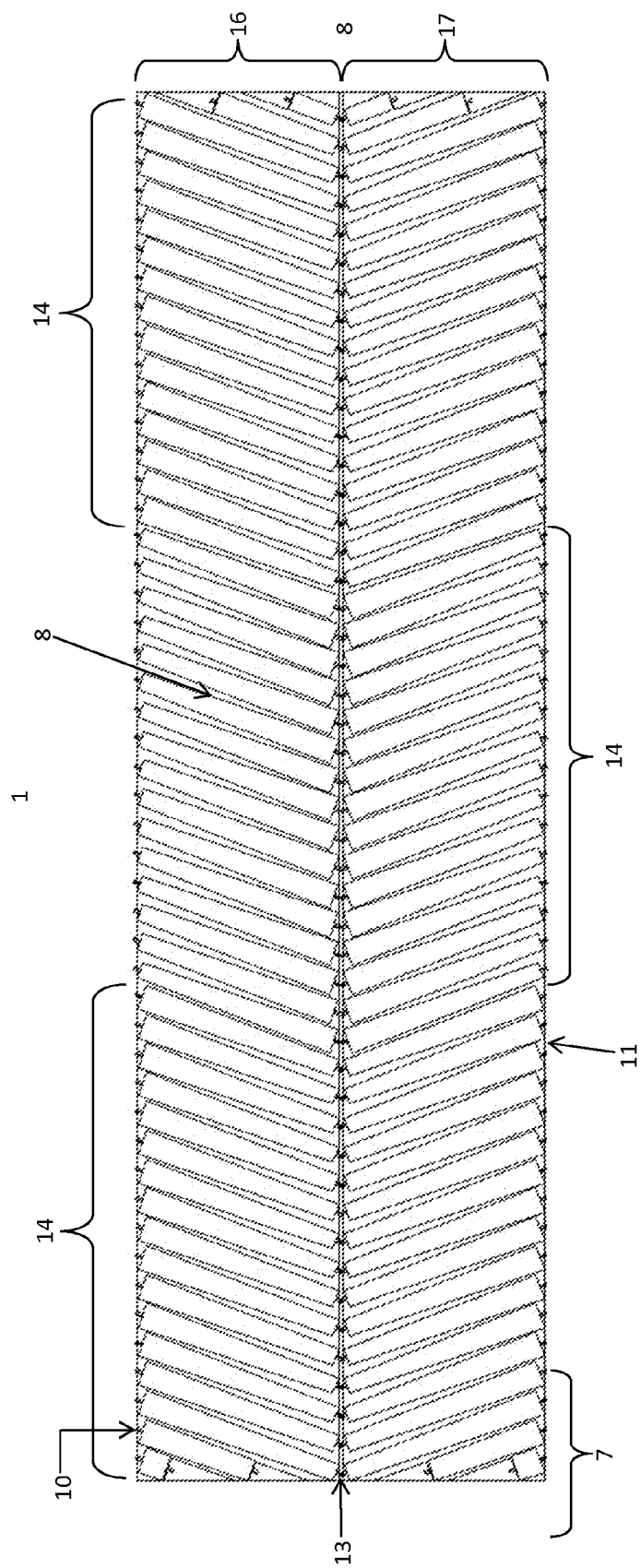
FIG. 1A is a plan view of a singulating conveyor with three conveyor sets.
Figure 1B:
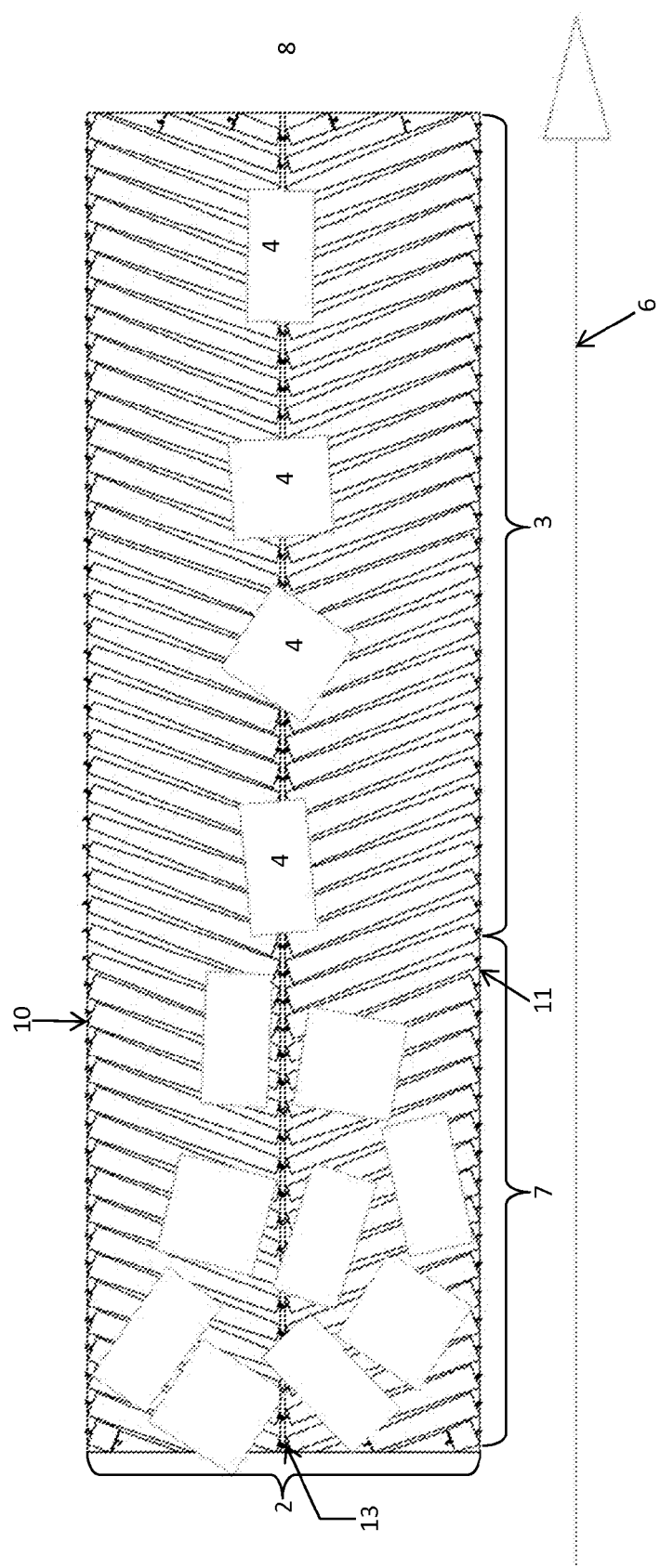
FIG. 1B is a plan view of a singulating conveyor indicating packages received in a jumbled order, which are then ordered and aligned as each package travels along the conveyor.
Figure 3:
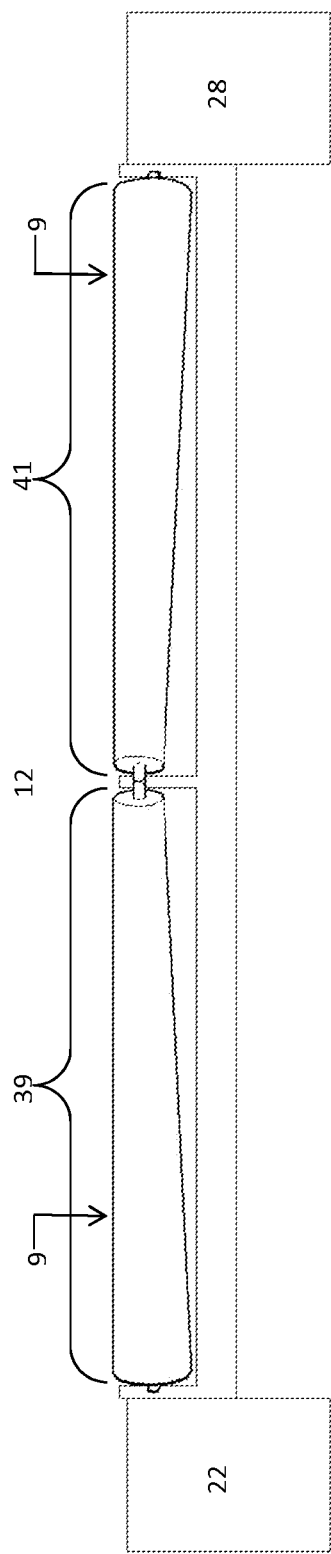
FIG. 3 is a profile view of the conveyor set from the package receiving area in the direction of flow showing the conveying surface.
Figure 4:
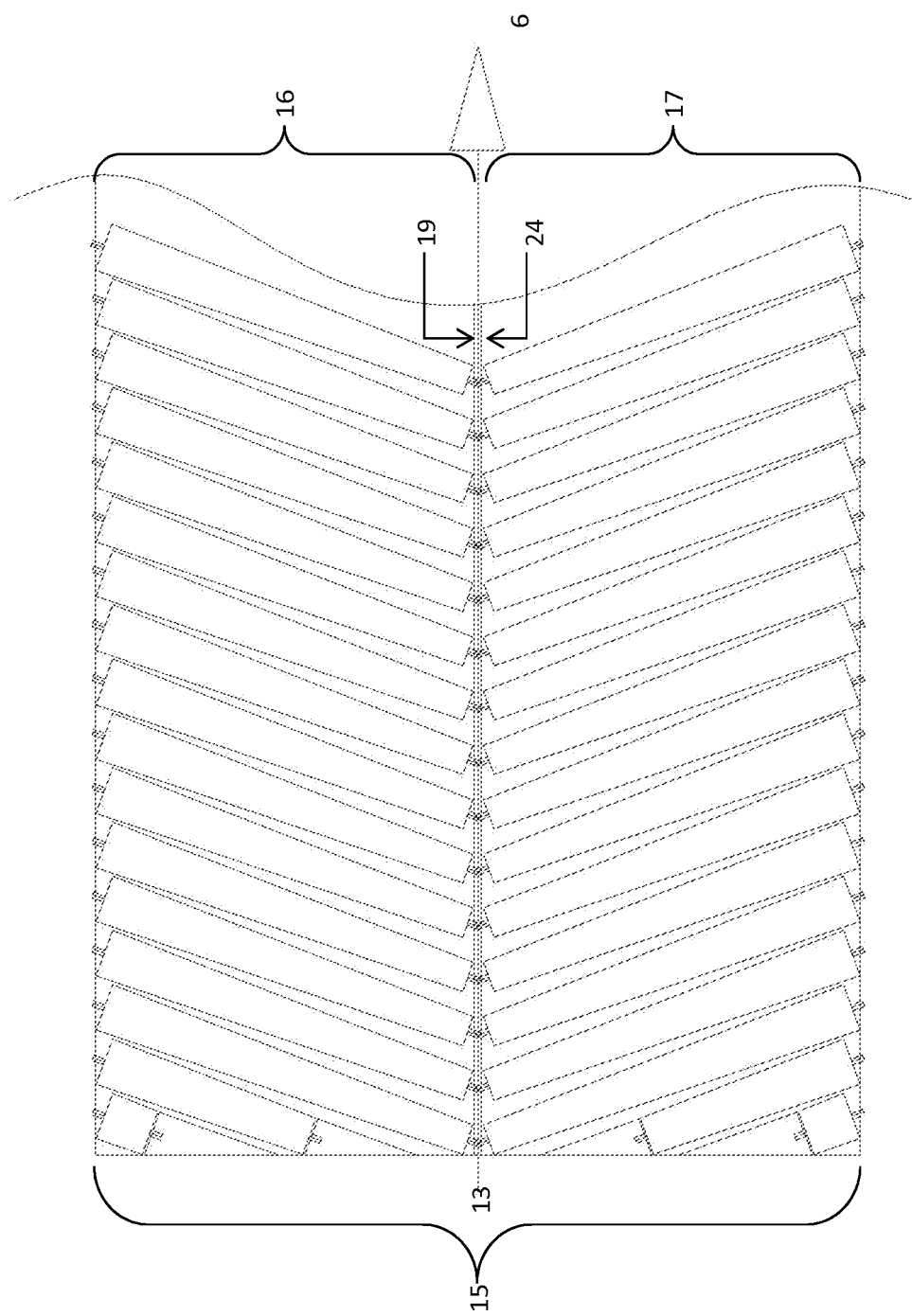
FIG. 4 is a plan view of the left group and right group of a conveyor set, indicating how the left group and right group are arranged to form the conveyor set.
Figure 5:
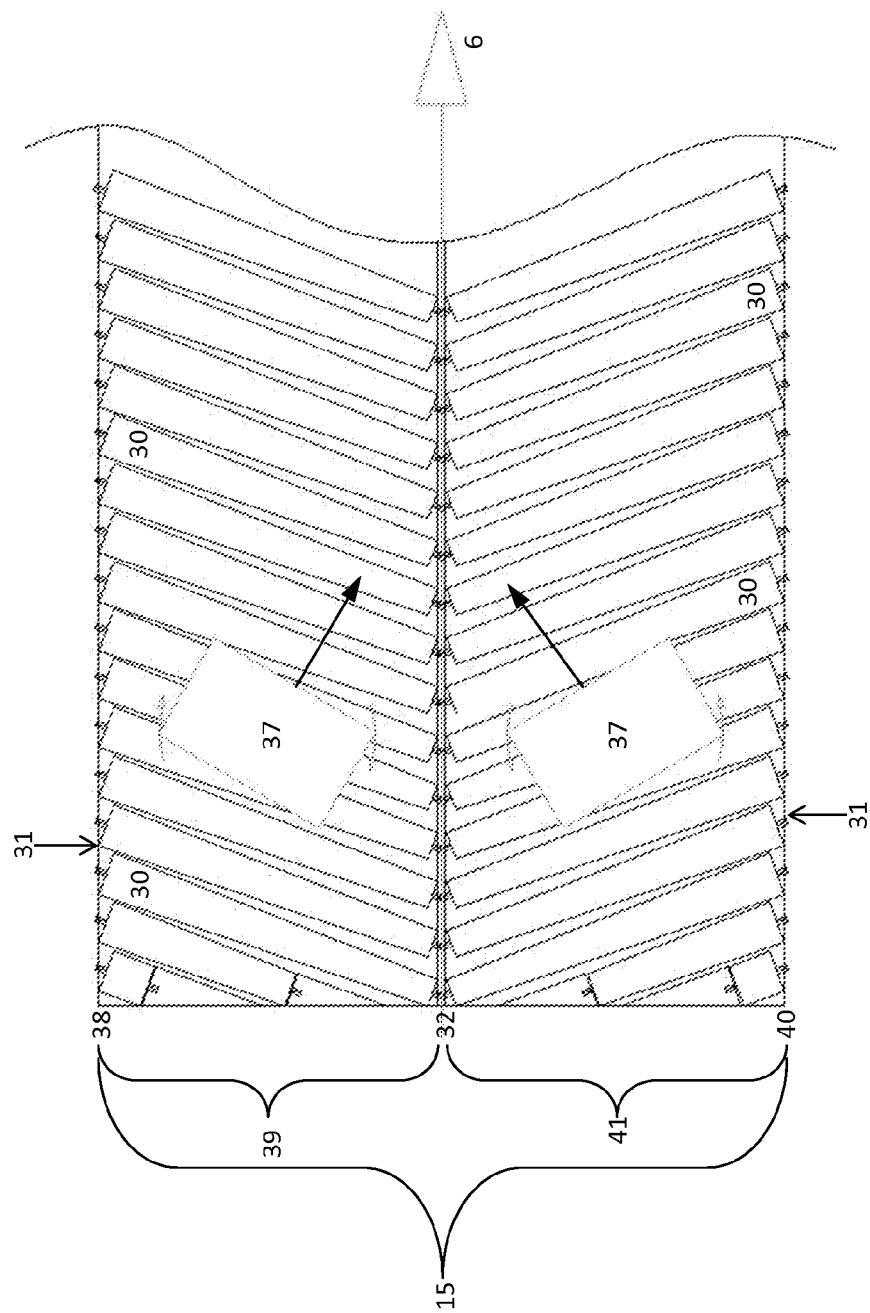
FIG. 5 is a plan view of the first embodiment of the conveyor set indicating how a package moves as it moves along the singulating conveyor system from the outer attachment means toward the center line and then along the centerline.
Figure 6:
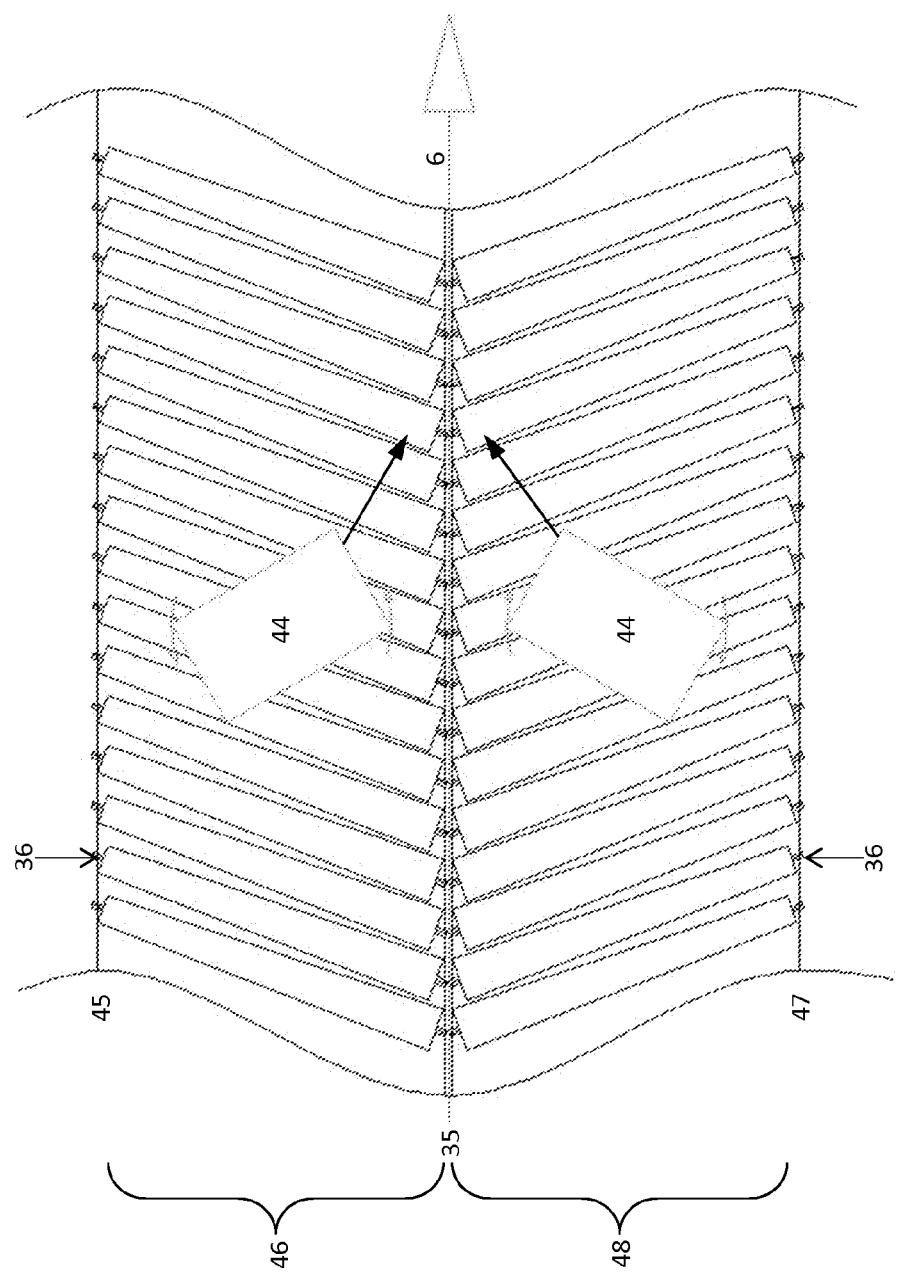
FIG. 6 is a plan view of the second embodiment of the conveyor set indicating how a package moves as it moves along the singulating conveyor system from the outer attachment means toward the center line and then along the centerline.
Figure 7:
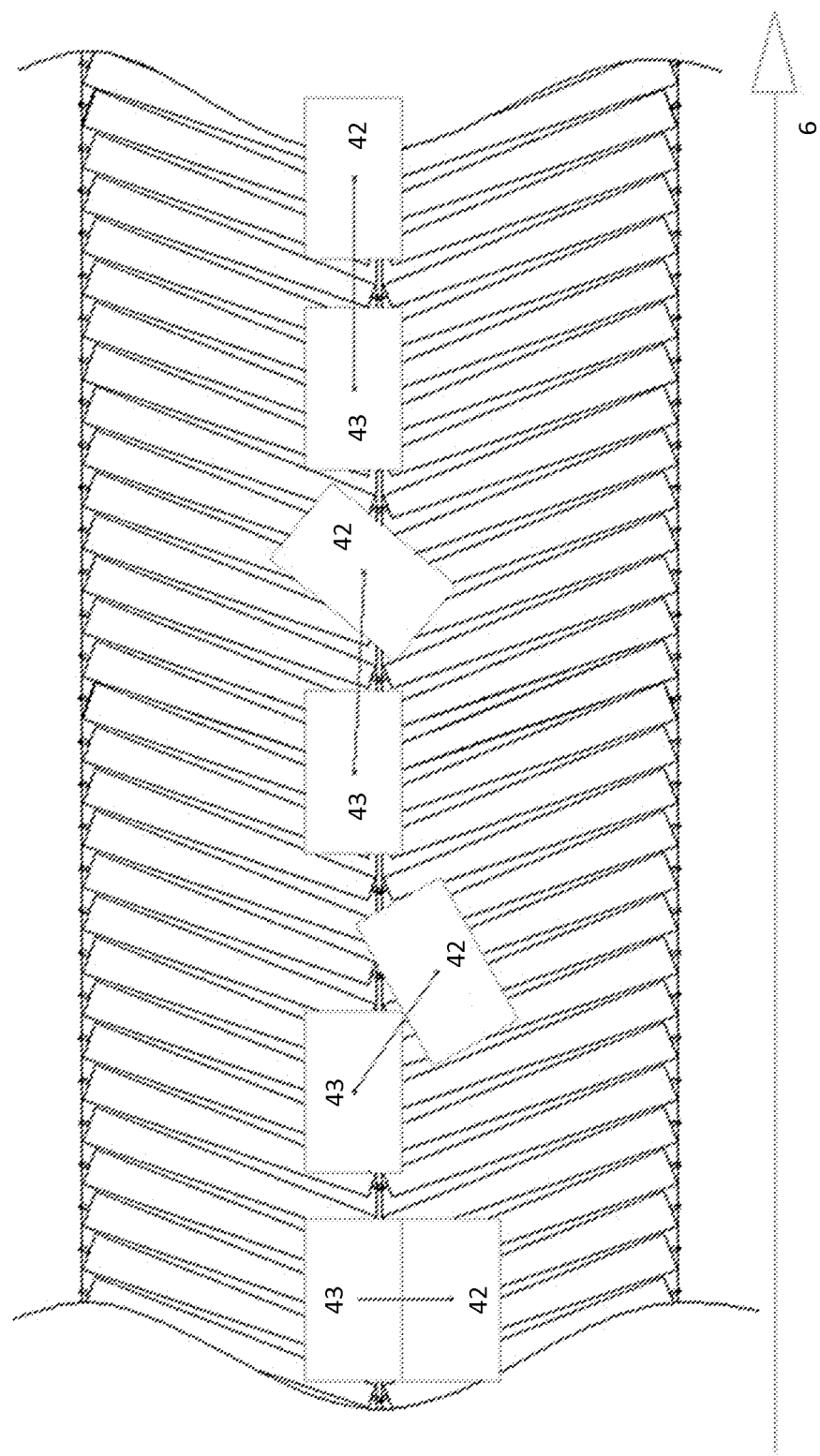
FIG. 7 is a plan view the first embodiment of the conveyor set that indicates how a package adjacent to a package traveling along the centerline would move ahead of the package traveling along the centerline.
Figure 8:
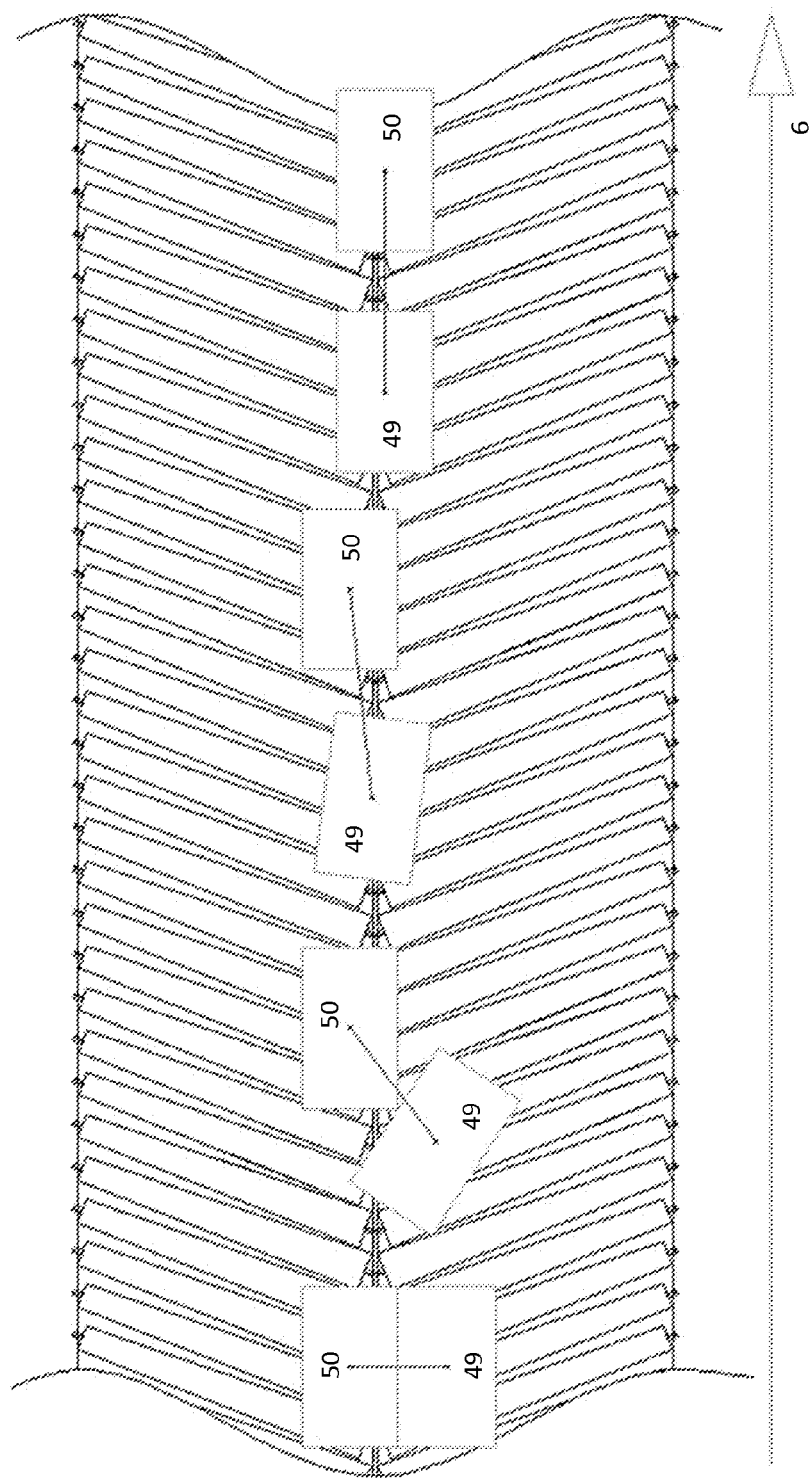
FIG. 8 is a plan view the second embodiment of the consecutive conveyor set that indicates how a package adjacent to a package traveling along the centerline would end up behind the package traveling along the centerline.

A singulating conveyor system 1 that receives a continuous flow of jumbled packages 2 of various sizes in and in various orientations which then sorts the jumbled packages 2 into a single file line of packages 3 and orients each package 4 in the single file line of packages 3 such that the maximum length 5 of each package 4 aligns with the direction of flow 6 of the singulating conveyor system 1. Where the singulating conveyor system 1 comprises a package receiving area 7, a package removing area 8, a direction of flow 6, a left outer attachment means 10, a right outer attachment means 11, a conveying surface 12, a centerline 13, and where the singulating conveyor system 1 is made up of a plurality of conveyor sets 14. Each conveyor set 15 within the plurality of conveyor sets 14 comprises a left group 16 and a right group 17.

The left group 16 comprises an outer attachment means 18, an inner attachment means 19, a plurality of tapered rollers 20 attached to the outer attachment means 18 and inner attachment means 19 in such a fashion so as to allow the plurality of tapered rollers 20 to rotate and so that the top edge of each roller 9 creates a horizontal plane. Where the plurality of tapered rollers 20 of the left group 16 are assembled in a herringbone pattern 21 such that the angle alpha ("α") between the left group 16 inner attachment means 19 and each of the plurality of tapered rollers 19 is less than 90° in the direction of flow 6 of the singulating conveyor system 1. Where the rotation of the plurality of tapered rollers 20 of the left group 16 is controlled by a drive means 22.

The right group 17 comprises an outer attachment means 23, an inner attachment means 24, a plurality of tapered rollers 25 attached to the outer attachment means 23 and inner attachment means 24 in such a fashion so as to allow the plurality of tapered rollers 25 to rotate and so that the top edge of each roller 26 creates a horizontal plane. Where the plurality of tapered rollers 25 of the right group 17 are assembled in a herringbone pattern 27 such that the angle alpha ("β") between the right group 17 inner attachment means 24 and each of the plurality of tapered rollers 25 is less than 90° in the direction of flow 6 of the singulating conveyor system 1. Where the rotation of the plurality of tapered rollers 25 of the right group 17 is controlled by a drive means 28.

In order to form the conveyor set 15, the inner attachment means 19 of the left group 16 is positioned against the inner attachment means 24 of the right group 17 to create the centerline 13 of the singulating conveyor system 1. The drive means 22 for the left group 16 and the drive means 28 for the right group 17 may be the same means or distinct for each group and may be the same between the plurality of conveyor sets 14 as well.

In the first embodiment 29 of the conveyor set 15 the plurality of tapered rollers 30 are oriented such that the plurality of tapered rollers 30 taper from the outer attachment means 31 toward the centerline 32. In this embodiment 29, the rate of rotation of the plurality of tapered rollers 30 along the outer attachment means 31 is faster than the rate of rotation of the plurality of tapered rollers 30 along the centerline 32. This orientation causes a package 37 that enters the conveyor set 15 along the outer edge 38 of the left group 39 to rotate in a clockwise fashion and toward the centerline 32 while traveling in the direction of flow 6, while a package 37 that enters the conveyor set 15 along the outer edge 40 of the right group 41 to rotate in a counter-clockwise fashion and toward the centerline 32 while traveling in the direction of flow 6. Package rotation stops when the package 37 crosses the centerline 32 and the clockwise rotation from the left group 39 is countered by the counter-clockwise rotation from the right group 41. A package that is adjacent 42 to a package traveling along the centerline 43 moves faster than the package traveling along the centerline 43 and so the adjacent package 42 would move ahead of the package traveling along the centerline 43.

In the second embodiment 33 of the conveyor set 15 the plurality of tapered rollers 34 are oriented such that the plurality of tapered rollers 34 taper from the centerline 35 toward the outer attachment means 36. In this embodiment 33, the rate of rotation of the plurality of tapered rollers 34 along the centerline 35 is faster than the rate of rotation of the plurality of tapered rollers 34 along the outer attachment means 36. This orientation causes a package 44 that enters the conveyor set near the outer edge 45 of the left group 46 to rotate in a counter-clockwise fashion and toward the centerline 35 while traveling in the direction of flow 6, while a package 44 that enters the conveyor set near the outer edge 47 of the right group 48 to rotate in a clockwise fashion and toward the centerline 35 while traveling in the direction of flow 6. Package rotation stops when the package 44 crosses the centerline 35 and the counter-clockwise rotation from the left group 46 is countered by the clockwise rotation from the right group 48. Packages that are adjacent 49 to a package traveling along the centerline 50 move slower than the package traveling along the centerline 50 and so would fall behind the package traveling along the centerline 50.

What is claimed is:

1. A singulating conveyor designed to accept a continuous, randomly arranged collection of packages and sort the packages into a single file, lengthwise oriented fashion comprising:

a plurality of conveyor sets with each conveyor set comprising a left group and a right group;

the left group comprising an outer attachment means, an inner attachment means, a plurality of tapered rollers attached to the outer attachment means and inner attachment means in such a fashion so as to allow the plurality of tapered rollers to rotate and so that the top edge of each roller creates a horizontal plane;

the plurality of tapered rollers of the left group are assembled in a herringbone pattern such that the angle alpha ("α") between the left group inner attachment means and the tapered roller is 90° or less in the direction of flow of the singulating conveyor;

the rotation of tapered rollers of the left group is controlled by a drive means;

the right group comprises an outer attachment means, an inner attachment means, a plurality of tapered rollers attached to the outer attachment means and inner attachment means in such a fashion so as to allow the plurality of tapered rollers to rotate and so that the top edge of each roller creates a horizontal plane;

the plurality of tapered rollers of the right group are assembled in a herringbone pattern such that the angle ("β") between the right group inner attachment means and the tapered roller is 90° or less in the direction of flow of the singulating conveyor;

the rotation of tapered rollers of the right group is controlled by a drive means;

the inner attachment means of the left group is positioned against the inner attachment means of the right group to create the centerline of the conveyor set;

the tapered rollers in the first conveyor set of the plurality of conveyor sets are oriented such that each tapered roller is tapered from the outer attachment means toward the inner attachment means so that, because of the difference in speed of rotation along each tapered roller and the herringbone layout of the tapered rollers, as packages enter the first conveyor set each package is re-oriented so that the longest length of the package aligns with the flow direction of the singulating conveyor, each package is adjusted to move along the conveyor set centerline and those packages closer to the outer attachment means of the singulating conveyor move faster and ahead of those packages located closer to the centerline; and wherein the plurality of tapered rollers in any of the subsequent conveyor sets are oriented so that each tapered roller tapers from the centerline toward the outer attachment means such that, if an outside package is adjacent to a package traveling along the centerline, the package traveling along the centerline moves faster than the outside package and the outside package would fall in behind the package traveling along the centerline.

2. The singulating conveyor of claim 1 where the plurality of tapered rollers of a subsequent set are oriented so that each tapered roller tapers from the outer attachment means toward the centerline such that, if an outside package is adjacent to a package traveling along the centerline, the package traveling along the centerline moves slower than the outside package and the outside package would move ahead of the package traveling along the centerline.

3. The singulating conveyor of claim 2 wherein the plurality of tapered rollers in any of the subsequent conveyor sets are oriented so that each tapered roller tapers from the centerline toward the outer attachment means such that, if an outside package is adjacent to a package traveling along the centerline, the package traveling along the centerline moves faster than the outside package and the outside package would fall in behind the package traveling along the centerline.

4. A singulating conveyor designed to accept a continuous, randomly arranged collection of packages and sort the packages into a single file, lengthwise oriented fashion comprising:
   plurality of conveyor sets with each conveyor set comprising a left group and a right group;
   the left group comprising an outer attachment means, an inner attachment means, a plurality of tapered rollers attached to the outer attachment means and inner attachment means in such a fashion so as to allow the plurality of tapered rollers to rotate and so that the top edge of each roller creates a horizontal plane;
   the plurality of tapered rollers of the left group are assembled in a herringbone pattern such that the angle alpha ("α") between the left group inner attachment means and the tapered roller is 90° or less in the direction of flow of the singulating conveyor;
   the rotation of tapered rollers of the left group is controlled by a drive means;
   the right group comprises an outer attachment means, an inner attachment means, a plurality of tapered rollers attached to the outer attachment means and inner attachment means in such a fashion so as to allow the plurality of tapered rollers to rotate and so that the top edge of each roller creates a horizontal plane;
   the plurality of tapered rollers of the right group are assembled in a herringbone pattern such that the angle ("β") between the right group inner attachment means and the tapered roller is 90° or less in the direction of flow of the singulating conveyor;
   the rotation of tapered rollers of the right group is controlled by a drive means;
   the inner attachment means of the left group is positioned against the inner attachment means of the right group to create the centerline of the conveyor set;
   the tapered rollers in the first conveyor set of the plurality of conveyor sets are oriented such that each tapered roller is tapered from the inner attachment means toward the outer attachment means so that, because of the difference in speed of rotation along each tapered roller and the herringbone layout of the tapered rollers, as packages enter the first conveyor set each package is re-oriented so that the longest length of the package aligns with the flow direction of the singulating conveyor, each package is adjusted to move along the conveyor set centerline and those packages closer to the centerline of the singulating conveyor move faster and ahead of those packages located closer to the outer attachment means; and
   wherein the plurality of tapered rollers in any of the subsequent conveyor sets are oriented so that each tapered roller tapers from the outer attachment means toward the centerline such that, if an outside package is adjacent to a package traveling along the centerline, the package traveling along the centerline moves slower than the outside package and the outside package would move ahead of the package traveling along the centerline.

5. The singulating conveyor of claim 4 where the plurality of tapered rollers in any of the subsequent conveyor sets are oriented so that each tapered roller tapers from the centerline toward the outer attachment means such that, if an outside package is adjacent to a package traveling along the centerline, the package traveling along the centerline moves faster than the outside package and the outside package would fall in behind the package traveling along the centerline.

6. The singulating conveyor of claim 5 where the plurality of tapered rollers in any of the subsequent conveyor sets are oriented so that each tapered roller tapers from the outer attachment means toward the centerline such that, if an outside package is adjacent to a package traveling along the centerline, the package traveling along the centerline moves slower than the outside package and the outside package would move ahead of the package traveling along the centerline.

* * * * *